United States Patent [19]
Beasley

[11] Patent Number: 5,228,174
[45] Date of Patent: Jul. 20, 1993

[54] BRUSH COMPACTOR

[76] Inventor: David E. Beasley, 4040 Carr St., Wheat Ridge, Colo. 80033

[21] Appl. No.: 809,664

[22] Filed: Dec. 17, 1991

[51] Int. Cl.$^5$ ............................................. B65D 63/16
[52] U.S. Cl. .......................................... 24/28; 24/130
[58] Field of Search ............. 24/18, 28, 129 R, 129 B, 24/130

[56] References Cited

U.S. PATENT DOCUMENTS

| | | | |
|---|---|---|---|
| 457,292 | 8/1891 | Reed et al. | 24/28 |
| 574,778 | 1/1897 | Brady. | |
| 879,591 | 2/1908 | Roussel | 24/18 |
| 1,161,297 | 11/1915 | Faust | 24/18 |
| 2,733,527 | 2/1956 | Flood | 24/130 X |
| 3,953,911 | 5/1976 | Fishack | 24/130 X |

FOREIGN PATENT DOCUMENTS 2534550 4/1984 France.
96427 5/1960 Norway.

*Primary Examiner*—James R. Brittain
*Attorney, Agent, or Firm*—Kyle W. Rost

[57] ABSTRACT

A brush compactor useable in combination with an elongated rope has a plate like body with a pressure application area permitting the user to push on it with his foot while tightening the rope. An attachment point on the plate holds one end of the rope, while a wedged locking member selectively releases and positively locks a second end of the rope, according to the direction of rope movement through the locking member.

3 Claims, 1 Drawing Sheet

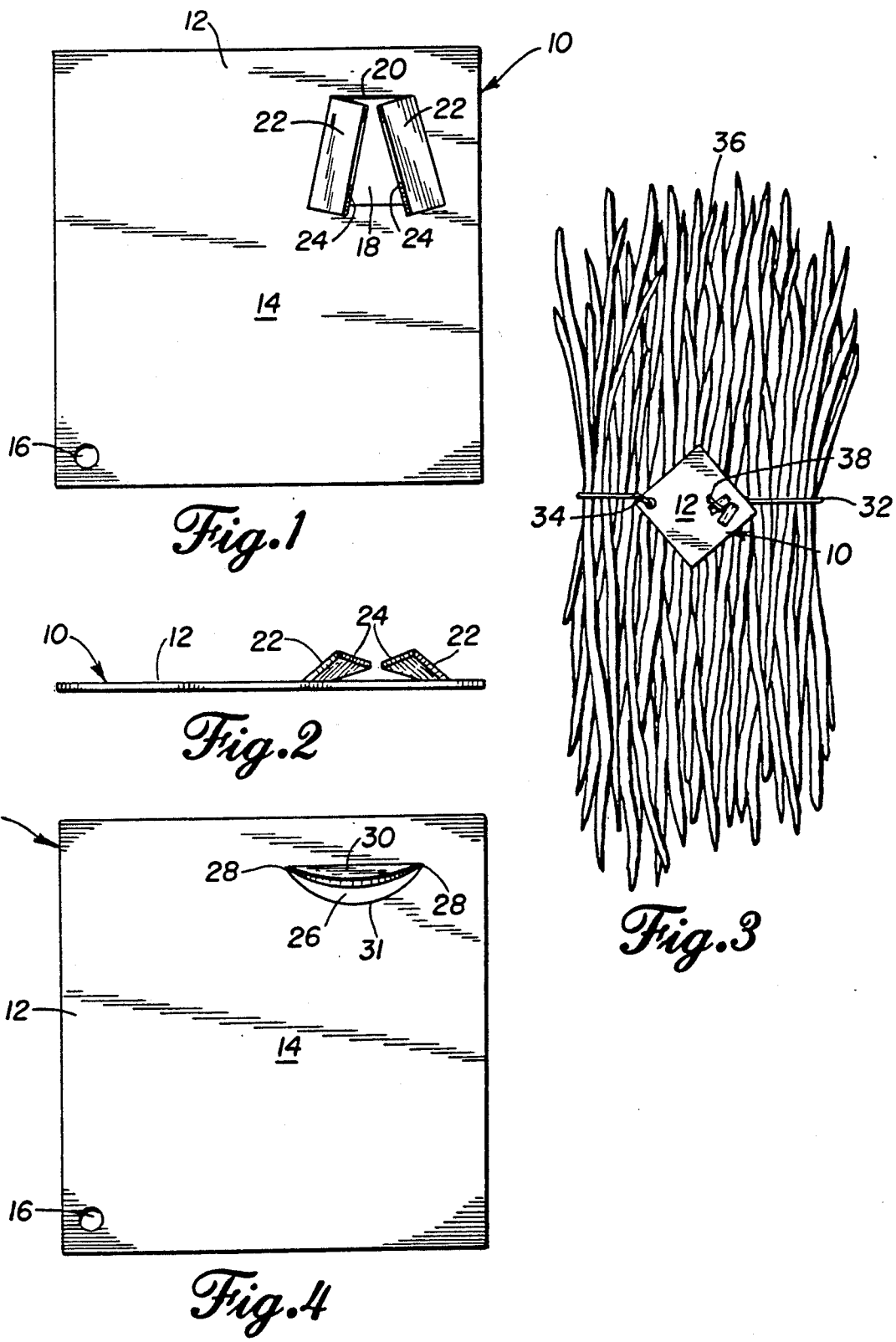

BRUSH COMPACTOR

TECHNICAL FIELD

The invention generally relates both to presses and to buckles, buttons, clasps and the like. More specifically, the invention relates to cord and rope holders, especially to those having adjustable loop. The invention similarly relates to cord and rope holders of the one-piece variety having a wedged slot. In particular, an apparatus is disclosed for compressing faggots of branches, sticks and other brush.

BACKGROUND ART

Sticks, branches, and other brush occupy a large volume when collected, as after trimming a tree or bush. Whether such brush is to be burned, hauled away as trash, or handled in any other way, it presents a problem in handling because of its loose state. Thus, it is commonly desired to compress such materials into faggots that are more easily handled.

One apparatus that has been developed for this purpose is disclosed in French Patent No. 2,534,550. This apparatus is a reuseable press employing a rope tourniquet that is located to encircle the branches while they rest on a frame. A rotary handle tightens the tourniquet, compressing the faggot. Then a wire can be wrapped around the bundle as a permanent holder, permitting the tourniquet to be removed for reuse.

A somewhat similar press is disclosed in Norwegian Patent No. 96,427. Here a frame supports the faggot of sticks while a rope or cable is placed around it, one end of the rope is hooked to a lever, and the opposite end of the rope is attached to another part of the frame. The lever is moved to tighten the cable around the faggot of sticks to compress it, permitting the faggot to be permanently bound in compact conditon by another wrapping fastener.

Another type of clasp is shown in U.S. Pat. No. 574,778 to Brady, in which a corn shock tightener is formed of a plate that carries a pulley and one end of a rope, as well as one end of a supply of twine. While holding the second end of the rope, the user tosses the plate around a corn shock and then inserts the rope around the pulley. Thereafter the loop of rope around the corn shock is tightened with compressing action, and then, the rope is temporarily secured between a pair or wires forming a friction clamp. The twine has been looped around the shock by this same process, and the twine is tied as a permanent fastener before the rope is released.

While all of these devices enable a faggot of sticks to be compressed, they are complex and costly. For this reason, each is designed as a permanent, reuseable appliance, and each requires that a separate, disposable binding be applied about the faggot after the compacting has been achieved by use of a reuseable, heavy duty compressing rope or cable. Thus, the work of compressing and compacting a faggot is isolated from the work of retaining the compression on the faggot.

This result is a disadvantage because the disposable, retaining binding is of a different tensile strength than the compressing binding. If, as in the case of the Brady patent, the retaining binding is twine, while the compressing binding is rope, it will result that the retaining binding is of significantly lower relative tensile strength. Hence, the retaining binding may be prone to fail under the expansive tension applied by the compressed branches.

Another disadvantage in the Brady patent is that the friction clamp, formed of wires, has only limited compression. Even when the compression binding is a stout rope, the efficiency of the Brady device may be poor due to an inability of the clamp to hold the rope against the expansive tension applied by the compressed branches.

Still another disadvantage is that the work of wrapping the faggot must be accomplished twice, although Brady attempts to minimize this problem by simultaneously wrapping the faggot with both the compressing rope and the retaining twine. Nevertheless, when many faggots are to be compressed, the extra work and time spend on duplication of effort becomes notable.

Further, it is inconvenient to operate, store and carry around large and ackward devices, especially when the job they accomplish is simplistic in nature. Many people will refuse to bother with seemingly excess complexity under those circumstances. Thus, perfectly operable labor saving devices, such as the known compactors of the prior art, may fall into disuse simply because handling, storing, and using them is too much trouble.

It would be desirable to have available an extremely easy to handle brush compacting device that is capable of performing in place of all of the above prior art devices. Further, it would be desirable to have a brush compacting device capable of performing in an improved manner, such that the compacting and binding tasks can be combined in a single step. Also, it would be desirable to have a compacting device that is extremely efficient, such that the compressing binding can be positively locked even when a high degree of compression has been applied. It also would be desirable to have an equivalent or superior device far smaller than any of those in the prior art, that can be stored compactly and in large quantities. Finally, it would be desirable that such a device be so low in cost and constructed in such a simple manner that it would be reasonable to dispose of one such device with each faggot of branches.

To achieve the foregoing and other objects and in accordance with the purpose of the present invention, as embodied and broadly described herein, the brush compactor of this invention may comprise the following.

DISCLOSURE OF INVENTION

Against the described background, it is therefore a general object of the invention to provide an improved brush compactor that compacts and binds brush in a single step.

A more specific object is to provide a brush compactor that positively locks the compressing member regardless of the tension applied to it.

Another object is to provide a disposable brush compactor of such inexpensive and simple construction that there is no need to remove the compactor from each faggot of branches before the branches are disposed of.

A further object is to provide a brush compactor of small size, suited for easy handling and efficient storage of a large number of the compactors.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a brush compactor for use in combination with an elongated flexible member is provided with a body member having a pressure application area of suitable size to permit the user to apply the user's foot against the body member. An attaching member provides a means for engaging and fixedly attaching a first end of an elongated, flexible member to the body member. A wedged locking member provides a means for selectively releasing and positively locking a second end of an elongated, flexible member. The locking member is oriented with respect to the attaching member such that locking occurs when the elongated member within said locking member moves relatively away from the attaching member.

The accompanying drawings, which are incorporated in and form a part of the specification illustrate preferred embodiments of the present invention, and together with the description, serve to explain the principles of the invention. In the drawings:

BRIEF DESCRIPTION OF THE DRAWINGS

FIG. 1 is a top plan view of the brush compactor.

FIG. 2 is a front elevational view thereof.

FIG. 3 is a top view of a faggot of branches held in compacted conditions by the brush compactor.

FIG. 4 is a top plan view of another embodiment of the brush compactor.

BEST MODE FOR CARRYING OUT THE INVENTION

The invention is a brush compactor that is very compact, low in cost, simple in structure, easy to store, and efficient to use. From a structural viewpoint, the brush compactor includes one piece that is a modified plate, and the compactor may include two pieces, depending upon whether or not it is supplied with an elongated flexible member such as a rope, twine, or other tying means. In either event, the compactor is intended for use in combination with such a tying cord.

With reference to FIG. 1, the brush compactor 10 includes a body member 12, which is preferred to be plate-like, constructed of planar, sheet material. Sheet metal is suitable, while other materials such as plastic and composition wood products also are suitable. The shape of the body member as shown in the figures is square, but the invention is not required to have any particular shape or regularity to its perimeter. The body member is preferred to be around three to five inches in transverse dimension, so that an excessive amount of material is not used. However, there should be sufficient surface space to allow for a central area of the body member that defines a pressure application area 14 of suitable size to permit a user to apply his foot against this central area. The details of use are more fully set out below.

The brush compactor includes an attaching means for engaging and fixedly attaching to the body member a first end of the tying means, as mentioned above. A suitable and preferred attaching means is hole 16, shown to be formed in one corner of the square body shown in the figures. By way of example and not limitation, the same function could be served by an ear, tab, hook, large-headed protrusion, pin, screw, rivet or the like. A cord passing through hole 16 or engaging another of the listed, typical attaching means can be secured to the body member with a knot. In the case of hole 16, a knot formed in the cord itself can be sufficient to prevent the knotted end of the cord from pulling through the hole With one end of a cord securable to the attaching means, the brush compactor also provides a means for selectively releasing and positively locking the second end of the cord to the compactor so that the brush can be drawn into a compact bundle by repeated pulling on the cord. A wedged locking means is provided for this purpose. In FIGS. 1 and 2, this locking means is a V-shaped slot 18. The orientation of slot 18 with respect to the attaching means is such that locking occurs when the cord passing through the slot moves relatively away from the attaching means, into the narrow apex 20 of the slot. The narrow tip 20 of the slot, as measured at the slot edge more distant from the attaching means, is directed generally away from the attaching means 16 by more than a right angle. Thus, when the elongated cord is wrapped around a compacted load of brush and passes through the slot, the cord automatically is urged to move toward the apex 20 of the slot under force of expansion of the compacted load.

In the embodiment of the slot shown in FIGS. 1 and 2, the material from the slot opening is centrally split and displaced to form a pair of flanges 22, one lying along each side edge of the V-shaped slot 18. Each flange 22 extends generally toward the opposed flange, each in a separate plane and angling acutely upwardly from the body member. The flanges converge near the end of slot 18 at apex 20. As best shown in FIG. 2, the flanges 22 also are acutely angled above the plane of the body member 12, with ends of the flanges nearer the wide part of the slot raised further above the plane than are the ends of the flanges nearer the apex. Thus, if a cord is threaded through the slot 18 from bottom to top in the view of FIG. 2, upward pulling on the cord will urge the cord toward the wider end of the slot, allowing the cord to pass. However, downward pulling, in opposition to the flanges, will wedge the cord in the narrower end of the slot and lock the cord against further opposing movement. Metal flanges, due to the resilience of the metal material, are especially effective at locking the cord. The flange edges 24, which engage the cord, may have teeth formed thereon to further increase effectiveness of locking action. The embodiment of FIGS. 1 and 2 is conveniently formed from sheet metal by a stamping operation. It can be formed from plastic by molding or heat forming.

Another embodiment of the wedged locking means is shown in FIG. 4 as slot 26, which has an arcuate shape having tapering end portions 28. At least one of the tapering end portions 28, is directed away from the attaching means 16 by no less than a right angle. With this relative position, a tying cord passing from hole 16 around a compacted load and through the slot automatically is urged to move into the narrow end of the slot under expansion of the compacted load.

The arcuate slot 26 may have a flange 30 lying along at least one edge of the slot. This flange extends generally toward the opposed edge 31 and is inclined acutely upwardly from the plane of the body member 12. The function of flange 30 is similar to the function of flanges 22 in the prior embodiment. As before, the flange is effective to automatically lock the tying cord against reverse movement through slot 26 after a load of brush has been partially compacted. The flange has improved effectiveness when it is formed of resilient material such as sheet metal or is provided with teeth.

The tying means or cord 32, FIG. 4, with which the brush compactor is used can range over a wide variety of sizes. This cord can be supplied separately by the user in order to permit selection of gauge and length to suit the user's specific job. Clearly, the gauge of the cord should be thin enough to permit passage through hole 16, although if the attaching means is a structure other than a hole, suitable cord gauge may be unlimited. The hole can be of any reasonable size, so there is no necessary practical limitation on gauge of the cord. It may be desirable, however, to anticipate a certain cord size as being suitable for compacting a typical faggot of branches and size the hole accordingly. This coordination of cord diameter to hole size will enable the end of the cord to be secured in the hole merely by knotting the end of the cord to create an end stop. The cord or like elongated member could be supplied as a part of the brush compactor, either pre-attached or as separate element. Similarly, a plurality of the brush compactors could be supplied with a continuous roll of the cord, permitting the user to select the desired length for each use.

The cord or other flexible member also should be sized to be able to pass through the wedged locking means, such as slots 18 or 26. While there is the potential to cause these slots to be as wide as desired at their widest point, as a practical matter for the uses described herein the slots will not exceed about one-half inch. At their narrow end, the slots can be tapered to a point, if necessary. Thus, the range of useable cord gauge is very large and far exceeds any practical need of the user within the described purposes. Nevertheless, it is important to note that the brush compactor can be adapted to even unanticipated purposes by adjusting the size and strength of its construction.

By way of example, the operation of the brush compactor 10 can be understood by reference to FIG. 3. As shown, a suitable tying means such as cord 32 is attached to the body member 12 of the embodiment of FIGS. 1 and 2. The first end 34 of the cord is connected to the body 12 by passing the cord's end through hole 16, which is better shown in FIGS. 1 or 4. In FIG. 3, the cord end 34 is shown to be secured by tying around the body 12. The length of the cord is passed around a bundle of branches 36 by any technique desired, such as by extending the cord on the ground and placing the branches across it. Then the cord is circled about the bundle and second cord end 38 is threaded through slot 18, which is better shown in FIG. 1. Thereafter, the bundle is compacted by tightening the cord.

The compacting process employs the brush compactor in several interrelated capacities. In a first, the wedged locking means of slot 18 provides automatic, alternating release and positive locking of the cord. When the cord end 38 is pulled, the V-shaped configuration of slot 18 causes the cord to move toward the broad end of the slot, relatively toward the attaching means, releasing the cord from any lock in the apex of the slot. Thus, the user can pull tight the cord to compact the faggot of branches 36. When the user releases the pulling force on the cord, the natural tendency of the faggot of branches to expand urges the ring defined by the cord and brush compactor to form a larger encircling structure. The result of this urging is that the cord end 38 automatically is moved toward the apex of the slot 18, relatively away from attaching means, positively locking the cord against any reverse movement through the slot. The greater the expansive force, the greater is the force urging the cord into the wedge of the slot. Hence, the lock is positive. If the slot is equipped with resilient flanges 22 or 30, the lock is even stronger and the margins of the slot are better able to flex without slipping in response to opposing, expansive forces.

While the cord 32 is being tightened, the body member 12 provides still further assistance to the user. Pressure application area 14 is available to receive application of a user's foot against the body member. Foot pressure against the body 12 both allows the cord 32 to be pulled with increased force and additionally compacts the branches by compressing them under the foot pressure on top of the body member. The resulting faggot of sticks or brush is very tightly compacted and ready for disposal. There is no need to additionally bind the faggot or further tie off the cord. The entire faggot with cord and body plate 12 attached can be handled or disposed of as a unit.

As described, the brush compactor 10 meets all of the objects that are desired of the invention. The construction is simple, essentially in one piece that can be stamped from sheet metal. Because no special complexity is involved in manufacture, the device is economical and of low cost. Thus, it is reasonable and practical to use the device one time only and permit it to be disposed of with the faggot of brush or branches to which it is attached. Consequently, this device truly compacts and binds a faggot in a single step. Further, a large number of these brush compactors can be stored in a small space, since they will fit together in nested arrangement to make a compact package. The plate-like structures permit dozens of the compactors to be kept in a stack only a few inches high. In addition to storing in a small area, the compactors are small and convenient to handle or carry about. A large number of the compactors can be carried in one hand or a pocket, permitting these devices to be taken wherever needed with great ease. The many disadvantages of the prior art are overcome by this simple, inexpensive, and easy to use brush compactor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. A brush compactor for use in combination with an elongated flexible member, comprising:
   a body member formed of generally planar sheet material and defining thereon a pressure application area of suitable size to permit, in use, the application of a user's foot against the body member;
   an attaching means for engaging and fixedly attaching, in use, a first end of an elongated, flexible member to said body member;
   a wedged locking means having at least one narrow end, for, in use, selectively releasing and positively locking in its narrow end a second end of an elongated, flexible member;
   wherein said locking means comprises a V-shaped slot through the plane of the body member, defined by a relatively closer edge and a relatively more distant edge with respect to the attaching means, having a pair of flanges unitary with said body member and overlying said slot, one lying along each side edge of the V-shaped slot and extending generally toward the opposed flange, each in a separate plane and angling acutely upwardly from the plane of the body member; and wherein the slot is oriented with respect to said attaching means with its more distant edge angling away from the attaching means and toward said narrow end, such that locking occurs when the elongated member within said locking means moves relatively away from the attaching means.

2. The brush compactor of claim 1, wherein the more distant edge of said V-shaped slot, relative to said attaching means, is directed generally away from the attaching means and toward said narrow end by an angle sufficient that, in use with an elongated member around a compacted load and passing through the slot, the elongated member automatically is guided to move into the narrow end of the slot under expansion of the compacted load.

3. The brush compactor of claim 2, wherein said flanges are formed of a resilient material.

* * * * *